Oct. 18, 1960

C. P. DAVEY 2,956,743

SLIDE RULE

Filed Jan. 12, 1956

*INVENTOR:—*
CLARENCE P. DAVEY
BY:—
Marzall, Johnston, Cook & Root
ATTORNEYS

Oct. 18, 1960  C. P. DAVEY  2,956,743
SLIDE RULE
Filed Jan. 12, 1956  2 Sheets-Sheet 2
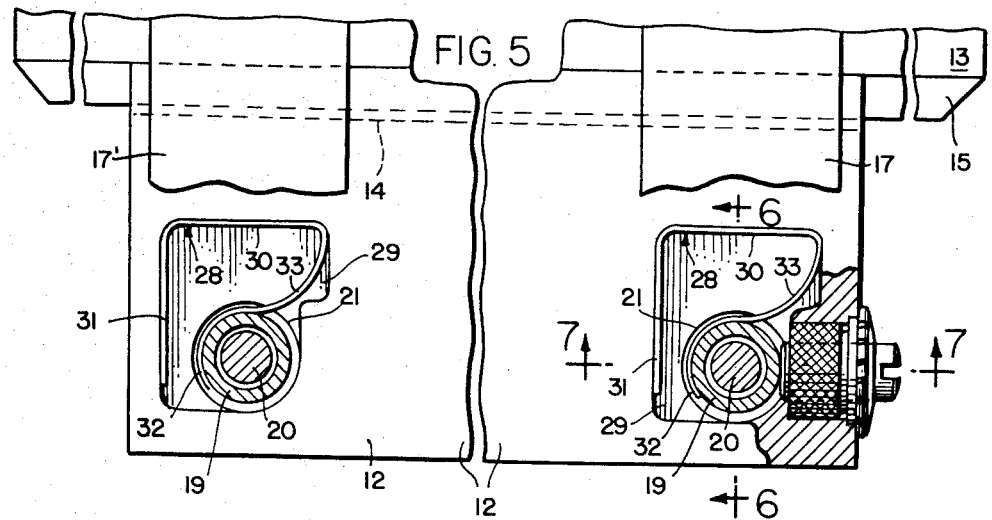
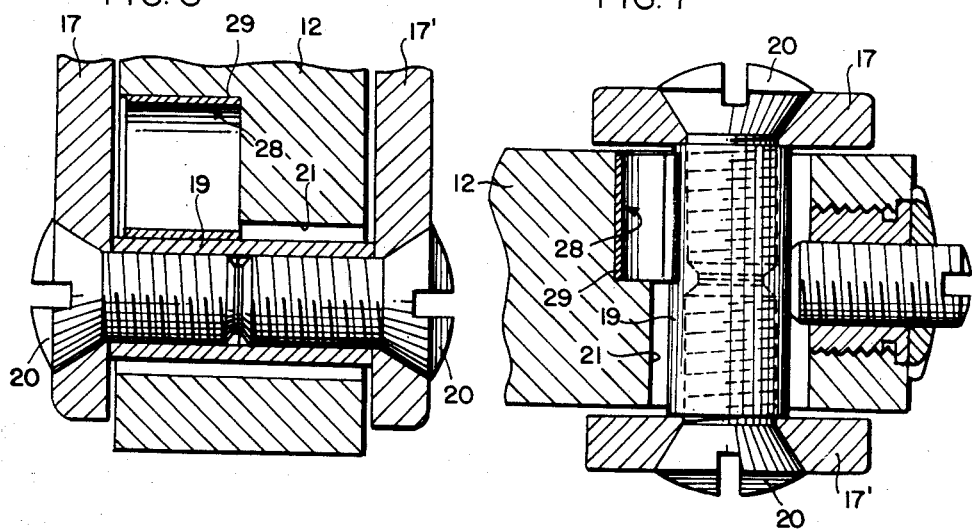
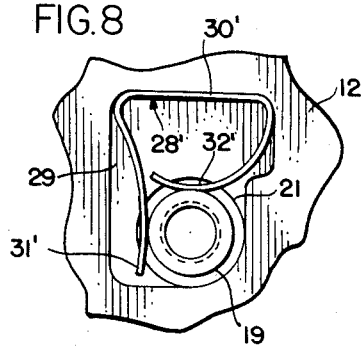
INVENTOR:—
CLARENCE P. DAVEY
BY:—
Marzall, Johnston, Cook & Root
ATTORNEYS

United States Patent Office 2,956,743
Patented Oct. 18, 1960

2,956,743

SLIDE RULE

Clarence P. Davey, Oak Park, Ill., assignor to Eugene Dietzgen Co., Chicago, Ill., a corporation of Delaware Filed Jan. 12, 1956, Ser. No. 558,780

20 Claims. (Cl. 235—70)

The present invention relates in general to calculating devices, and has more particular reference to slide rules.

A slide rule commonly comprises a frame providing a pair of parallel, spaced apart rails, between the facing edges of which an elongated slide is movably mounted, the facing edges of the rails and the opposite rail engaging edges of the slide being formed with interfitting means, such as cooperating tongues and grooves, for holding the slide in the frame for movement between the rails to any desired position of adjustment longitudinally thereof. The slide and rails also are commonly formed to provide coplanar surfaces carrying graduated scales extending longitudinally thereof, as at or adjacent the meeting edges of the slide and rails, whereby slide carried scales may be longitudinally adjusted with respect to scales carried by the rails, and vice versa.

A slide rule conventionally may also include an indicator in the form of a runner supported on and adjustable longitudinally of the frame, the runner commonly embodying a pane of transparent material, such as glass, supported in position above the scale carrying surfaces of the slide and rails and formed with an index commonly comprising a hairline engraved in the pane.

For optimum slide rule operation, it is desirable that the slide be freely movable between the rails while snugly yet lightly supported thereby, the frictional resistance of the relatively movable parts desirably being only sufficient to hold the slide against accidental displacement from any adjusted position longitudinally of the rails; and it is, of course, desirable that substantially uniform sliding conditions, including the snug yet light support of the slide between the rails, be maintained throughout the limits of adjusting movement of the slide in either direction between the rails. Such optimum slide rule operation is difficultly obtainable since the slide and rails commonly are made of organic substances such as wood, of synthetic substances such as plastic, or of metal, which are subject to continual changes of shape due to one or more of various causes, including wear, warping, shrinking, thermal expansion and contraction, and the like. Indeed, ordinary variations in atmospheric conditions may cause such expansion or contraction in the slide and rail components of slide rules as to materially alter the original adjustment thereof and cause the slide to become too loosely or too tightly held between the rails, thereby causing computation inaccuracies. Such adjustment alteration also may result from normal wear of the parts during the service life of the device.

An important object of the present invention is to provide a new and improved slide rule construction embodying means serving to maintain light, substantially uniform frictional engagement between the rails and slide of a slide rule; a further object being to provide new and improved means for yieldingly urging the rails of a slide rule each toward the other and upon the rail engaging surfaces of a cooperating slide, to thereby snugly yet lightly hold the slide for longitudinal movement freely between said rails.

Another important object is to provide spring means in the frame structure of a slide rule in position to yieldingly bias the rails mutually inwardly each toward the other, whereby to frictionally press the same upon the rail engaging surfaces of a cooperating slide member to hold the same snugly yet in freely slidable fashion therebetween within the limits of relative adjustment of the slide with respect to the rails.

Another important object resides in providing a duplex slide rule structure comprising a slide and rail having scale carrying surfaces on the opposite sides thereof, the opposite ends of the rails being interconnected and held in spaced relation by spacing plates or brackets secured to and extending between the rails at the opposite ends thereof, including resilient thrust means operatively connected between said spacing brackets and one of said rails, which is shiftably mounted on and with respect to said brackets, whereby to yieldingly bias the said shiftably mounted rail on said brackets in a direction toward the other of said rails to thereby yieldingly press said rails mutually inwardly upon the rail engaging surfaces of a cooperating slide mounted therebetween; a further object being to employ helical compression spring means for pressing slide rule rails upon the cooperating slide; a still further object being to employ rail pressing springs at each of the opposite ends of a slide rule frame.

A further object of the invention is to provide for the longitudinal adjustment of one rail of a slide rule structure with respect to a cooperating rail, whereby to accurately aline scales carried by said rails; a further object being to yieldingly bias one of the rails of a slide rule for movement in a direction longitudinally with respect to the other, and to provide adjustable means for relatively shifting said rails against said bias; a still further object being to employ spring means for longitudinally biasing one slide rule rail with respect to the other and to employ an adjustable set screw operable to adjustably shift the biased rail against the influence of its biasing spring; a further object being to employ a helical compression spring for longitudinally biasing one slide rule rail with respect to a cooperating rail.

Another important object is to provide common spring means in a slide rule structure and operable not only to yieldingly urge the rails of the rule mutually inwardly to yieldingly press the same upon the rail engaging portions of a cooperating slide, but also to bias one of the rails longitudinally with respect to the other to permit the scales carried by the rails to be accurately alined by means of an adjusting screw operating against the longitudinal rail biasing effect of the spring; a further object being to utilize a suitably configurated leaf spring for biasing one rail of a slide rule longitudinally with respect to the other and for yieldingly urging the rails of the rule for frictional engagement with the cooperating slide.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 5 is a greatly enlarged fragmentary plan view illustrating another and preferred construction embodying the present invention and incorporating leaf spring means for rail biasing purposes;

Figure 1:
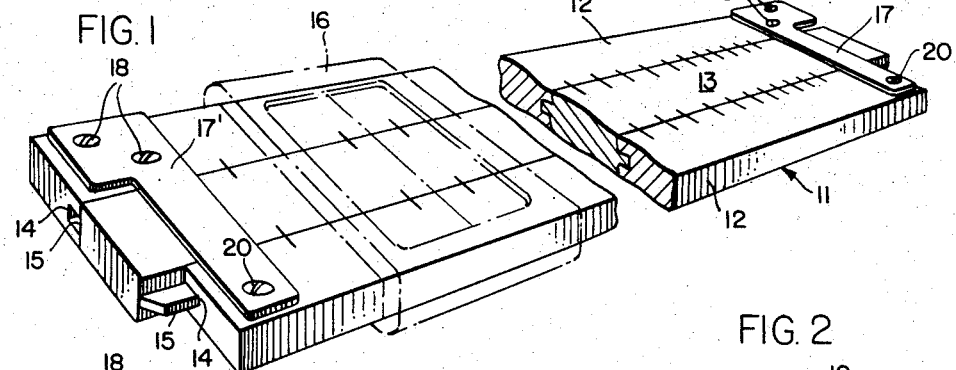
Fig. 1 is a perspective view of a slide rule embodying the present invention.

Figs. 6 and 7 respectively are enlarged sectional views taken substantially along the line 6—6 and 7—7 in Fig. 5; and Fig. 8 is a plan view illustrating a leaf spring of modified configuration for rail biasing purposes.

To illustrate the invention the drawings show a slide rule 11 comprising a frame embodying a pair of parallel, spaced apart rails 12 and 12', suitably secured in spaced apart relationship, and a slide bar or member 13 mounted in the frame for longitudinal sliding movement between the rails. To this end, the rails and slide bar may be formed with interfitting tongues and grooves along the engaging edges thereof. As shown, the rails may be formed with grooves 14 along the inwardly facing sides or edges thereof, while the slide bar may be formed with outstanding ribs or tongues 15 along each of the opposite edges thereof for sliding reception in the rail grooves 14. A conventional runner 16 may also be mounted for sliding movement on and longitudinally of the rails.

Suitable longitudinally extending calculating scales may be formed upon the faces of the rails and slide bar, the illustrated rule being of the duplex or double faced type having calculating scales inscribed or otherwise formed upon the opposite faces of the rails and slide bar. It will be obvious, of course, that the present invention is not necessarily limited to double faced slide rules, although particularly well suited for incorporation in such duplex type rules. Indeed, the novel features of the invention, if desired, may be incorporated in single face slide rules of the Mannheim type, by appropriate modification.

As shown, however, the rails 12 and 12' of the illustrated duplex slide rule are secured in spaced relationship by means of conventional spacing plates or brackets 17 and 17' secured in pairs to the opposite sides of the rails, at the opposite ends thereof, in position overlying the opposite faces of the slide bar which is movable freely between the spacing plates 17 and 17'. In order to support the slide bar 13 snugly yet slidably between the rails, at least one of the rails, such as the rail 12', may be rigidly secured to the brackets 17 and 17', as by means of fastening studs, screws or rivets 18. The other rail 12, however, may be mounted on and between each bracket pair 17, 17' in fashion permitting limited relative movement of the rail 12 with respect to the brackets. In accordance with the present invention, spacement of the inwardly facing surfaces of the bracket plates 17 and 17' may be such as to permit the rail 12 to move freely between both pairs of brackets, a spacing sleeve 19 being secured between the ends of both bracket pairs which overlie the opposite sides of the rail 12, said sleeves 19 being secured, each to the bracket plates with which associated, by means of holding screws 20, or other suitable fastening means. The rail 12 also is formed, adjacent each of its opposite ends, with an opening or channel 21 therethrough, said channels being sized and disposed in position to receive the sleeves 19 loosely therein, the spacement of the axes of the bores 21 being equal to the spacement of the axes of the sleeves 19.

The present invention contemplates the provision of means for yieldingly urging the rail 12 on the spacing sleeves 19 in a direction toward the rail 12' in order thus, at all times, to lightly press the rails 12 and 12' yieldingly and resiliently upon the opposite side edges of the slide 13, to thereby maintain a desired pressure of the rails upon the slide, regardless of wear or other changes of shape as may occur in the slide and rails during the service life of the instrument as the result of warping, shrinking, thermal expansion or contraction, and the like. Another aspect of the present invention resides in the provision of means for the precise adjustment of the rail 12 between the plates 17 and 17' in a direction longitudinally of the rail 12', whereby to accurately and precisely aline, transversely of the slide rule, the scales carried on the faces of the rails 12 and 12'.

To these ends, the rail 12 may be provided with pockets or cavities carrying biasing spring means in position to bear upon the spacing sleeves 19, and hence, upon the plates 17 and 17' between which the sleeves 19 are rigidly secured, said biasing means being operative to yieldingly urge the rail 12 on the members 19 in a direction toward the rail 12'. In accordance with the present invention, spring means may also be provided on the rail 12 in position acting upon one or both of the members 19, in order to yieldingly urge the rail 12 between the plates 17 and 17' in one direction longitudinally of the frame 11; and adjustable means, conveniently comprising a set screw mounted on the rail 12 in position to bear on one of the members 19, may be provided for shifting the rail 12 between the members 17 and 17' in the longitudinal direction opposite that of the thrust of the biasing spring means.

Figure 2:
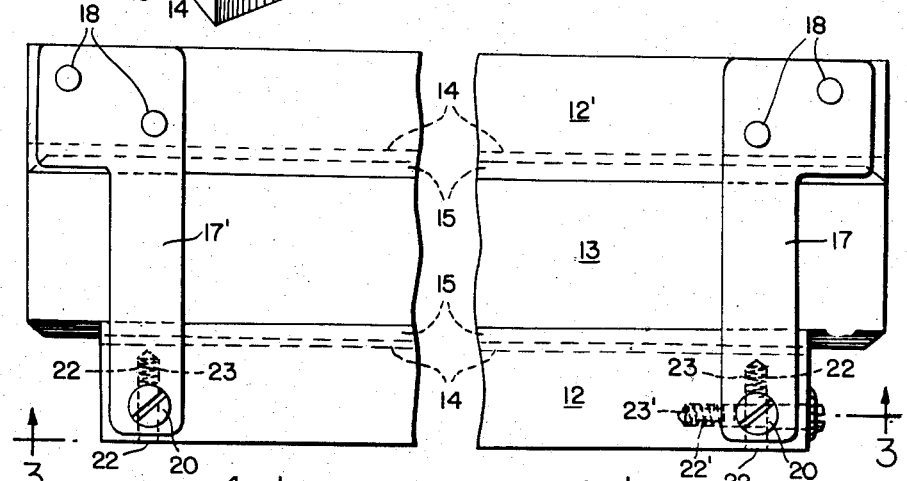
Fig. 2 is an enlarged fragmentary plan view of the slide rule and illustrating details of construction embodying the present invention and incorporating rail biasing helical spring means.
Figure 3:
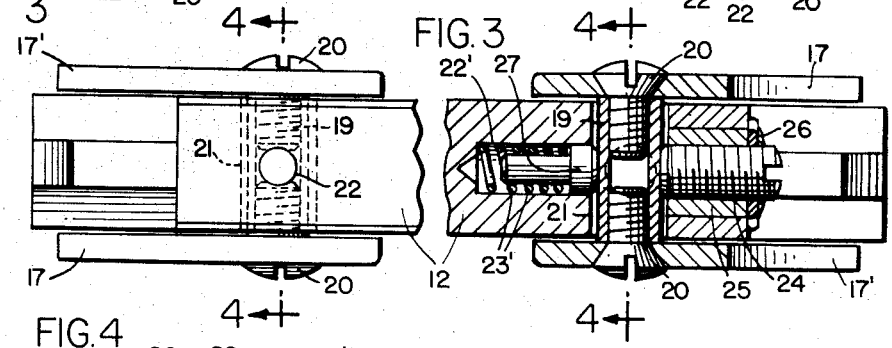
Fig. 3 is a greatly enlarged, partially sectionalized view taken substantially along the line 3—3 in Fig. 2.
Figure 4:
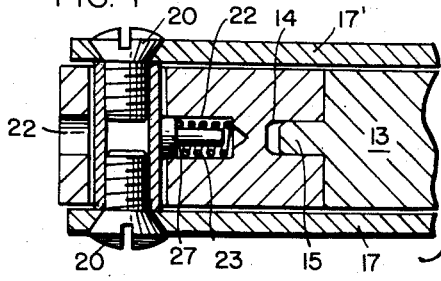
Fig. 4 is a sectional view taken substantially along the line 4—4 in Fig. 3.

The foregoing objectives may be accomplished, as shown more particularly in Figs. 2–4 of the drawings, by providing a pair of pockets 22 in the rail 12, said pockets preferably comprising bores intersecting each a channel 21, preferably medially of the opposite ends of said channels. The axes of the bores 22 preferably also extend at right angles with respect to the axes of the channels 21. The bores 22 open at one end at the outer or slide remote edge of the rail 12 and may have closed ends forming pocket bottoms in the rail 12 between the channels 21 and the slide engaging or inner edge of the rail. A preferably helical compression spring 23 may be mounted within each of the bores 22 in position to bear oppositely upon the rail 12 at the closed bottoms of the bores and on a bracket mounted sleeve member 19, in the bore connected channel 21.

The springs 23 may first be assembled in the bottom portions of the pockets 22. The sleeves 19 may then be applied in the channels 21 in position compressing the springs between the sleeves and the bottoms of the pockets. Thereafter, the sleeves 19 may be mounted in the associated bracket plates by attaching the fastening element 20 in place. It will be seen that the compression springs 23, arranged as aforesaid, will yieldingly thrust the rail 12 on the members 19 in a direction toward the rail 12', thereby yieldingly pressing the rails 12 and 12' mutually together and upon the opposite side edges of the slide 13 which, consequently, will be yieldingly held by and between the rails, under uniform pressure of desired magnitude determined by the thrust of the springs 23, such thrust desirably comprising a force such that the frictional engagement between the rails and the slide is only of magnitude sufficient to retain the slide against accidental displacement from longitudinally adjusted position between the rails 12 and 12'.

In order to provide for adjustment of the rail 12 in a longitudinal direction with respect to the rail 12', a pocket 22' may be formed in the body of the rail 12, such pocket preferably comprising a bore intersecting one of the channels 21 preferably medially thereof, the axis of the bore 22' preferably extending at right angles with respect to the axis of the channel 21. The bore 22' may open at one end at an end of the rail 12 and may have a closed end forming a pocket bottom in the body of the rail 12 on the side of the channel 21 remote from the open end of the bore. A preferably helical compression spring 23' may be mounted within the bore 22' in position to bear oppositely upon the layer 12 at the closed bottom of the bore and on the bracket mounted sleeve member 19.

The spring may be assembled in the bottom portions of the pocket prior to the application of the associated sleeve 19 in the channel 21 in position compressing the spring between the sleeve and the bottom of the pocket.

It will be seen that the spring 23', arranged as aforesaid, will yieldingly thrust the rail 12 on the member 19 in a direction longitudinally of the rail 12', and that the position of the rail may be adjusted with precision in a direction longitudinally of the rail 12' against the thrust of the spring 23' by means of an adjusting screw 24 mounted in the outer portions of the bore 22', between the channel 21 and the end of the rail 12, upon which the bore opens, the set screw having an outer end extending outwardly of the open end of the bore 22' and an inner end adapted to engage and press upon the sleeve 19 at the side thereof diametrically opposite the spring 23'. The outer end of the screw 24 may be formed for engagement with a turning tool, such as a screw driver, so that by turning the screw in the rail 12 in one direction or the other, the rail may be adjusted with or against the thrust of the spring 23' longitudinally of the rail 12', to thereby precisely aline rail carried scales.

If desired, the adjusting screw 24 may be threadingly engaged with screw threads formed directly in the material of the rail 12 at the outer end portions of the bore 22'. Alternately, an internally threaded screw carrying sleeve 25 of brass or other long wearing material, may be applied and secured in the outer end portions of the bore 22' which may be enlarged as shown to receive such a sleeve. A lock nut 26, if desired, may be provided for securing the screw 24 in adjusted position in the rail 12. Thrust members 27, each comprising a headed stem, may be provided for applying the thrust of the springs 23 and 23' upon the sleeves 19; and it will be apparent that a longitudinal thrust spring 23' may be provided for each of the members 19, if desired.

As shown more particularly in Figs. 5–8, inexpensive leaf springs may be employed for yieldingly urging the rails 12 and 12' together upon the opposite side edges of the slide and for biasing one slide longitudinally with respect to the other, in accordance with the present invention. As shown, the rail 12 may be provided with channels 21 for loosely receiving bracket mounted spacing sleeves 19, as in the embodiment shown in Figs. 2–4, and a leaf spring 28 may be associated with each of the sleeve members 19, each spring being disposed in a pocket 29 comprising a preferably flat bottomed cavity opening upon a face of the rail 12 adjacent and in communication with an associated channel 21. The springs 28 may each comprise means for yieldingly urging the rail 12 on the sleeves 19 in a direction toward the rail 12', and also for normally urging the rail 12 on the members 19 in a direction longitudinally of the rail 12'.

To this end, as shown more particularly in Fig. 5, the rail 12 may be provided with an adjustable set screw 24 mounted as in the embodiment shown in Figs. 2–4. The leaf springs 28 may each comprise a medial portion 30 and an end portion 31 bent to snugly fit against corresponding sides of the pocket 29, whereby to mount and support each spring in its corresponding pocket. The springs 28 may each include a curved end portion 32 connected with the medial portion 30 by a reversely curved resilient portion 33, the spring portions 32 being curved to engage a cooperating sleeve member 19 at the side thereof which faces toward the slide 13, as well as the side thereof which faces away from the adjustable set screw 24. The resilient spring portions 33 may thus serve not only to press the rail 12 on the sleeve members 19 in a direction toward the rail 12', but also to press said rail 12 in the longitudinal direction opposite from that in which said rail is moved by tightening the set screw inwardly upon the sleeve member 19 with which it is cooperatively associated. Each of the springs 28 thus urge the rail 12 on the sleeves 19 in a plurality of mutually normal directions.

As shown in Fig. 8 of the drawings, a modified leaf spring 28' may be employed for thrusting the rail 12 in a plurality of mutually normal directions on a sleeve 19, the spring 28' having a medial portion 38' adapted to seat upon a side of the cavity 29 remote from the member 19 in the channel 21, the spring 28' having an end portion 32' adapted to yieldingly bear upon a side of the associated member 19 to thrust the rail 12 toward the rail 12', the opposite end portion 31' of said spring resiliently bearing upon a side of the sleeve member 19 to thrust the rail yieldingly in a direction at right angles to the direction of thrust of the end portion 32' and opposite to the direction of thrust imparted on the rail by advancing the set screw 24 therein toward the sleeve 19.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the formes herein disclosed being preferred embodiments for the purpose of illustrating the invention.

The invention is hereby claimed as follows:

1. In a slide rule embodying a frame forming a pair of parallel spaced apart rails and a slide bar supported by and movable longitudinally between said rails, the combination, with said rails, of a leaf spring having a medial portion supported on one of said rails, and an abutment member supported on the other rail, said spring having portions disposed on opposite sides of and secured to said medial portion in position pressing upon the abutment member respectively in a direction normal to and in a direction parallel with said rails.

2. In a slide rule embodying a frame forming a pair of parallel spaced apart rails and a slide bar supported by and movable longitudinally between said rails, the combination, with said rails, of leaf spring means mounted upon and supported by one of said rails, and spring abutment means for applying the yielding thrust of said spring means upon the other rail for resiliently urging the rails together and upon the opposite sides of the slide bar.

3. In a slide rule embodying a frame forming a pair of parallel spaced apart rails and a slide bar supported by and movable longitudinally between said rails, the combination, with said rails, of spring means mounted upon and supported by one of said rails, a bracket on the other of said rails, and a spring abutting pin on said bracket in position to receive the thrust of said spring means and thereby resiliently urge the rails together and upon the opposite sides of the slide bar.

4. In a slide rule embodying a frame forming a pair of parallel spaced apart rails and a slide bar supported by and movable longitudinally between said rails, the combination, with said rails, of spring means for yieldingly urging one of said rails longitudinally with respect to the other, and adjustable means to hold said longitudinally urged rail in longitudinally adjusted position against the urge of said spring means.

5. In a slide rule embodying a frame forming a pair of parallel spaced apart rails and a slide bar supported by and movable longitudinally between said rails, the combination, with said rails, of spring means operable under compression of yieldingly urging one of said rails longitudinally with respect to the other, and adjustable means to hold said longitudinally urged rail in longitudinally adjusted position against the urge of said spring means.

6. In a slide rule embodying a frame forming a pair of parallel spaced apart rails and a slide bar supported by and movable longitudinally between said rails, the combination, with said rails, of leaf spring means mounted upon and supported by one of said rails, and spring abutment means for applying the resilient thrust of said spring means upon the other rail for yieldingly urging one of said rails longitudinally with respect to the other, and adjustable means to hold said longitudinally urged rail in longitudinally adjusted position against the urge of said spring means.

7. In a slide rule embodying a frame forming a pair of parallel spaced apart rails and a slide bar supported by and movable longitudinally between said rails, the combination, with said rails, of spring means mounted upon and supported by one of said rails, a bracket on the other of said rails, a spring abutting pin on said bracket in position to receive the thrust of said spring means and thereby yieldingly urge one of said rails longitudinally with respect to the other, and adjustable means to hold said longitudinally urged rail in longitudinally adjusted position against the urge of said spring means.

8. In a slide rule embodying a frame forming a pair of parallel spaced apart rails and a slide bar supported by and movable longitudinally between said rails, the combination, with said rails, of spring means for resiliently urging the rails together and upon the opposite sides of the slide bar and for yieldingly urging one of said rails longitudinally with respect to the other, and adjustable means to hold said longitudinally urged rail in longitudinally adjusted position against the urge of said spring means.

9. In a slide rule embodying a frame forming a pair of parallel spaced apart rails and a slide bar supported by and movable longitudinally between said rails, the combination, with said rails, of spring means for resiliently urging the rails together and upon the opposite sides of the slide bar, separate spring means for yieldingly urging one of said rails longitudinally with respect to the other, and adjustable means to hold said longitudinally urged rail in longitudinally adjusted position against the urge of said spring means.

10. In a slide rule embodying a frame forming a pair of parallel spaced apart rails and a slide bar supported by and movable longitudinally between said rails, the combination, with said rails, of leaf spring means for resiliently urging the rails together and upon the opposite sides of the slide bar and for yieldingly urging one of said rails longitudinally with respect to the other, and adjustable means to hold said longitudinally urged rail in longitudinally adjusted position against the urge of said spring means.

11. In a slide rule embodying a frame forming a pair of parallel spaced apart rails and a slide bar supported by and movable longitudinally between said rails, the combination, with said rails, of helical compression spring means for resiliently urging the rails together and upon the opposite sides of the slide bar and for yieldingly urging one of said rails longitudinally with respect to the other, and adjustable means to hold said longitudinally urged rail in longitudinally adjusted position against the urge of said spring means.

12. In a slide rule embodying a frame forming a pair of parallel spaced apart rails and a slide bar supported by and movable longitudinally between said rails, the combination wherein the frame provides bracket means secured on one of said rails, the other rail being shiftably mounted on said bracket means, and spring means on said shiftably mounted rail in position bearing upon said bracket means to normally urge a said rail in a desired direction with respect to the other.

13. In a slide rule embodying a frame forming a pair of parallel spaced apart rails and a slide bar supported by and movable longitudinally between said rails, the combination wherein the frame comprises bracket means secured on and carried by one of said rails, the other rail being shiftably mounted on said bracket means, and helical compression spring means on said shiftably mounted rail in position bearing upon said bracket means to normally urge the shiftably mounted rail in a desired direction with respect to the bracket carrying rail.

14. In a slide rule embodying a frame forming a pair of parallel spaced apart rails and a slide bar supported by and movable longitudinally between said rails, the combination wherein the frame provides bracket means secured on one of said rails, the other rail being shiftably mounted on said bracket means, and leaf spring means on said shiftably mounted rail in position bearing upon said bracket means to normally urge the shiftably mounted rail in a desired direction with respect to the bracket carrying rail.

15. In a slide rule embodying a frame forming a pair of parallel spaced apart rails and a slide bar supported by and movable longitudinally between said rails, the combination wherein the frame provides bracket means secured on one of said rails, the other rail being shiftably mounted on said bracket means, and spring means on said shiftably mounted rail in position bearing upon said bracket means to normally urge said rails mutually together and upon the opposite sides of the slide bar.

16. In a slide rule embodying a frame forming a pair of parallel spaced apart rails and a slide bar supported by and movable longitudinally between said rails, the combination wherein the frame provides support means secured on one of said rails, the other rail being shiftably mounted on said support means, and spring means on said shiftably mounted rail in position bearing upon said support means to normally urge said shiftably mounted rail longitudinally with respect to the other rail, and adjustable means for holding said longitudinally urged rail in longitudinally adjusted position against the urge of said spring means.

17. In a slide rule embodying a frame forming a pair of parallel spaced apart rails and a slide bar supported by and movable longitudinally between said rails, the combination wherein the frame provides a support rod secured to one of said rails to thereby constitute the same as a rod connected rail, the other rail being formed with an opening therein in position to loosely receive said support rod therethrough, to thereby constitute the same as a rod mounted rail, and spring means on said rod mounted rail in position bearing on said rod to yieldingly urge the rod mounted rail on said rod in a desired direction with respect to the rod connected rail.

18. In a slide rule embodying a frame forming a pair of parallel spaced apart rails and a slide bar supported by and movable longitudinally between said rails, the combination wherein the frame provides a thrust rod secured to one of said rails to thereby constitute the same as a rod carrying rail, the other rail being formed with a spring seat and an opening loosely receiving said rod therein, to thereby constitute the same as a rod mounted rail, and leaf spring means on said rod mounted rail, said leaf spring having a seat engaging portion formed for reception in said seat and an arcuately curved portion resiliently supported with respect to said seat engaging portion and shaped to engage a surface portion of said rod subtending an angle of the order of ninety degrees to thereby yieldingly urge the rod mounted rail with respect to said rod in a plurality of mutually normal directions.

19. In a slide rule embodying a frame forming a pair of parallel spaced apart rails and a slide bar supported by and movable longitudinally between said rails, the combination wherein the frame provides a support rod secured to one of said rails to thereby constitute the same as a rod connected rail, the other rail being formed with an opening therein in position to loosely receive said support rod therethrough, to thereby constitute the same as a rod mounted rail, and spring means on said rod mounted rail in position bearing on said rod to yieldingly urge the rod mounted rail on said rod toward said rod connected rail to thereby press the rails together upon the slide bar.

20. In a slide rule embodying a frame forming a pair of parallel spaced apart rails and a slide bar supported by and movable longitudinally between said rails, the combination wherein the frame provides a support rod secured to one of said rails to thereby constitute the same as a rod connected rail, the other rail being formed with an opening therein in position to loosely receive said support rod therethrough, to thereby constitute the same as a rod mounted rail, spring means on said rod mounted rail in position bearing on said rod to yieldingly urge the rod mounted rail on said rod longitudinally with respect to the rod connected rail, and an adjustable set screw, carried in the rod mounted rail, in position to press upon the rod in a direction opposite to that of the pressure of the said spring means on the rod.

References Cited in the file of this patent

UNITED STATES PATENTS

| | | |
|---|---|---|
| 606,288 | Mack | June 28, 1898 |
| 1,150,771 | Kueffel | Aug. 17, 1915 |
| 1,942,349 | Wompner | Jan. 2, 1934 |
| 2,449,954 | Roberts | Sept. 21, 1948 |

FOREIGN PATENTS

| | | |
|---|---|---|
| 58,837 | France | Nov. 25, 1953 |
| 365,393 | Germany | Dec. 14, 1922 |